March 15, 1927.  C. J. CHASE  1,620,997

SANITARY MILK BOTTLE AND CAP

Filed April 25, 1924

Charles J. Chase
INVENTOR

WITNESS:

BY
ATTORNEY

Patented Mar. 15, 1927.

1,620,997

UNITED STATES PATENT OFFICE.

CHARLES J. CHASE, OF PHILADELPHIA, PENNSYLVANIA.

SANITARY MILK BOTTLE AND CAP.

Application filed April 25, 1924. Serial No. 709,063.

This invention relates to containers or bottles, and more particularly to a bottle primarily designed for use in the dispensing of milk or analogous liquid products.

With the present approved type of milk bottles, an annular shoulder or ledge is formed about the mouth of the bottle against which the pasteboard cap or cover rests, leaving a relatively shallow recess at the top of the bottle, and also providing a slightly rounded shoulder on the bottle about the cap which as well as the recess accumulate dirt and foreign matter, tending to render the bottle unsanitary, and it is a well-known fact that the vast majority of people neglect to thoroughly cleanse or wash the mouth of the milk bottle before pouring the milk therefrom, and by so doing, the sanitation process through which the milk has passed is partially overcome by the milk picking up germs or other foreign matter from the edges or shelf on the milk bottle, especially in cases where the bottle is left by the milkman outdoors where it stands for one or more hours before being taken in the house.

An object of the invention is to provide a bottle and cap or cover therefor, which will overcome the unsanitary features and disadvantages as above enumerated, as well as to provide a bottle and cap, the cost of which will be only slightly greater, if any, than the cost of the present approved types of bottles and caps.

The present invention embodies in combination a bottle and cap in which the mouth of the bottle is thoroughly protected from the accumulation of germs or foreign matter thereon while the bottle is standing on a porch, steps or the like, as well as to provide a bottle in which all shoulders or shelves which might serve to collect foreign matter are eliminated.

Other objects of the invention will appear in the following detail description, and in the accompanying drawings wherein.

Figure 1:
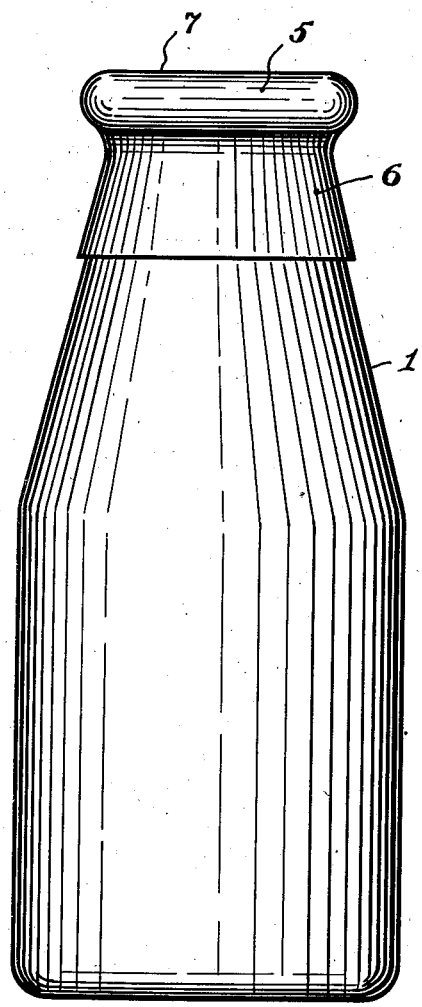
Figure 1 is a side elevation with the improved bottle showing the cap thereon.
Figure 2:
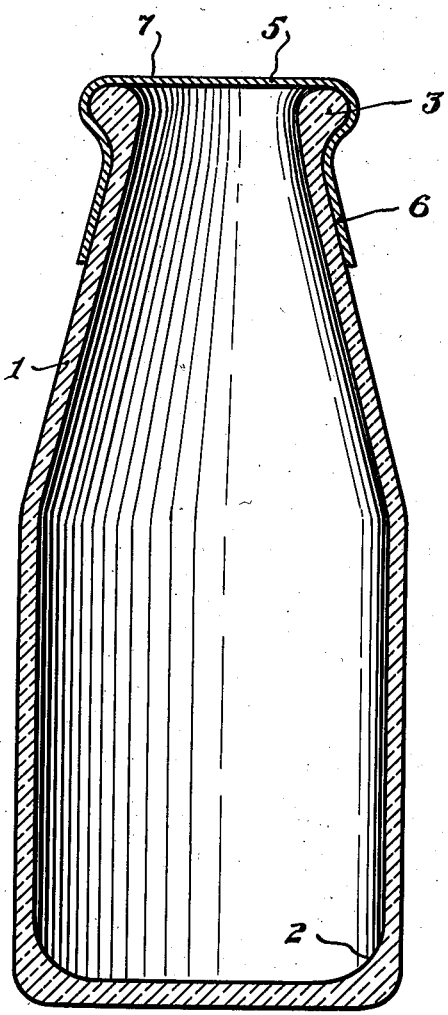
Figure 2 is a vertical section through the bottle and cap.

Referring more particularly to the drawings, the improved bottle which is constructed preferably of glass or analogous material and as shown in Figure 2 of the drawings the inner wall of the bottle is rounded at the bottom of the bottle as shown at 2 so as to eliminate corners in which milk might accumulate when soured, and also to facilitate the thorough cleansing of the bottle. The bottle 1 is shaped similar to the present shape of milk bottles, however, the mouth 3 of the bottle flares outwardly on a uniform transverse curve so as to eliminate any shoulders or ledges at the mouth of the bottle and to permit the contents of the bottle to be freely poured from the bottle. The cover 5 which is preferably made of paper, oiled or impregnated with paraffin so as to render it waterproof, is shaped to fit snugly over the mouth 3 of the bottle with the depending skirt 6 of the cap extending downwardly over the outer surface of the bottle for any predetermined distance below the mouth so as to provide a complete shed for water, moisture, or any other foreign material. The cap 5 is free from any abrupt shoulders or ledges except the flat top 7 thereof, and as it completely houses the mouth of the bottle, it will remove with it any foreign matter when it is taken from the bottle, thereby preventing such foreign matter from either falling into the bottle or being picked up by the milk or other contents of the bottle when poured from the bottle.

The cap 5 is preferably made of material which is inherently spring-like to a small degree, so that it will fit snugly against the bottle.

The sanitary cap 5 while in place on the bottle prevents handling the edges of the mouth of the bottle with soiled hands, and can be used after the mouth of the bottle has been nicked. That alone will effect a great saving in bottles.

It is, of course, to be understood, that the invention may be constructed in various other manners and the parts associated in different relations, and therefore, I do not desire to be limited in any manner, except as set forth in the claim hereunto appended.

What I claim is:

As a new article of manufacture, a bottle being free from angular portions at all parts of its inner surface and gradually curving outwardly in uniform transverse curvature at its mouth to provide an annular bead free from angular portions, and a cap shaped to snugly fit over the mouth of the bottle and house a portion of the bottle below its mouth.

In testimony whereof I affix my signature.

CHARLES J. CHASE.